US008375061B2

(12) United States Patent  
Aggarwal

(10) Patent No.: US 8,375,061 B2  
(45) Date of Patent: Feb. 12, 2013

(54) GRAPHICAL MODELS FOR REPRESENTING TEXT DOCUMENTS FOR COMPUTER ANALYSIS

(75) Inventor: Charu Aggarwal, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 12/796,266

(22) Filed: Jun. 8, 2010

(65) Prior Publication Data

US 2011/0302168 A1 Dec. 8, 2011

(51) Int. Cl.
*G06F 17/30* (2006.01)
(52) U.S. Cl. ..................... 707/798
(58) Field of Classification Search .......... 707/798
See application file for complete search history.

(56) References Cited

U.S. PATENT DOCUMENTS

| | | | |
|---|---|---|---|
| 4,980,918 A | | 12/1990 | Bahl et al. |
| 5,640,553 A * | 6/1997 | Schultz ................... 1/1 |
| 5,659,742 A * | 8/1997 | Beattie et al. ............ 1/1 |
| 5,675,788 A * | 10/1997 | Husick et al. ............ 1/1 |
| 5,717,914 A * | 2/1998 | Husick et al. ............ 1/1 |
| 5,721,902 A * | 2/1998 | Schultz ................... 1/1 |
| 5,737,734 A * | 4/1998 | Schultz ................... 1/1 |
| 5,740,421 A * | 4/1998 | Palmon ................... 1/1 |
| 5,742,816 A * | 4/1998 | Barr et al. ........... 707/728 |
| 5,822,731 A * | 10/1998 | Schultz ............... 704/270.1 |
| 5,873,076 A * | 2/1999 | Barr et al. ........... 704/270.1 |
| 5,963,940 A * | 10/1999 | Liddy et al. ............. 1/1 |
| 6,026,388 A * | 2/2000 | Liddy et al. ............. 1/1 |
| 6,070,134 A * | 5/2000 | Richardson et al. ...... 704/9 |
| 6,128,613 A * | 10/2000 | Wong et al. .......... 707/738 |
| 6,360,227 B1 * | 3/2002 | Aggarwal et al. ......... 1/1 |
| 6,549,896 B1 * | 4/2003 | Candan et al. ........... 1/1 |
| 6,877,001 B2 * | 4/2005 | Wolf et al. ........... 707/711 |
| 6,901,402 B1 * | 5/2005 | Corston-Oliver et al. ... 1/1 |
| 7,007,069 B2 * | 2/2006 | Newman et al. ....... 709/206 |
| 7,081,839 B2 * | 7/2006 | Savari ................... 341/107 |
| 7,197,497 B2 * | 3/2007 | Cossock ................. 1/1 |
| 7,313,556 B2 * | 12/2007 | Gallivan et al. ........... 1/1 |
| 7,346,629 B2 * | 3/2008 | Kapur et al. ............. 1/1 |
| 7,353,165 B2 * | 4/2008 | Zhou et al. ............ 704/5 |
| 7,447,683 B2 * | 11/2008 | Quiroga et al. ........... 1/1 |
| 7,457,808 B2 * | 11/2008 | Gaussier et al. ........... 1/1 |
| 7,461,073 B2 * | 12/2008 | Gao et al. ............... 1/1 |
| 7,499,919 B2 * | 3/2009 | Meyerzon et al. ......... 1/1 |
| 7,551,780 B2 * | 6/2009 | Nudd et al. .......... 382/190 |
| 7,555,427 B2 * | 6/2009 | Kirshenbaum .......... 704/9 |

(Continued)

OTHER PUBLICATIONS

K.R. Gee, D.J. Cook, "Text Classification Using Graph-Encoded Linguistic Elements", Recent Advances in Artificial Intelligence—Eighteenth International Florida Artificial Intelligence Research Society Conference, FLAIRS 2005.

(Continued)

*Primary Examiner* — Mark A Radtke
(74) *Attorney, Agent, or Firm* — F. Chau & Associates, LLC

(57) ABSTRACT

In a method for representing a text document with a graphical model, a document including a plurality of ordered words is received and a graph data structure for the document is created. The graph data structure includes a plurality of nodes and edges, with each node representing a distinct word in the document and each edge identifying a number of times two nodes occur within a predetermined distance from each other. The graph data structure is stored in an information repository.

9 Claims, 6 Drawing Sheets

U.S. PATENT DOCUMENTS

| | | | |
|---|---|---|---|
| 7,593,932 B2 * | 9/2009 | Lindh et al. | 1/1 |
| 7,599,917 B2 * | 10/2009 | Meyerzon et al. | 1/1 |
| 7,624,104 B2 * | 11/2009 | Berkhin et al. | 1/1 |
| 7,630,879 B2 | 12/2009 | Liu | |
| 7,672,511 B2 * | 3/2010 | Grady | 382/173 |
| 7,707,025 B2 * | 4/2010 | Whitelock | 704/5 |
| 7,730,085 B2 * | 6/2010 | Hassan et al. | 707/776 |
| 7,752,243 B2 * | 7/2010 | Hoeber et al. | 707/765 |
| 7,809,727 B2 * | 10/2010 | Gallivan et al. | 707/738 |
| 7,836,076 B2 * | 11/2010 | Forman et al. | 707/771 |
| 7,856,435 B2 * | 12/2010 | Nanavati et al. | 707/722 |
| 7,899,822 B2 * | 3/2011 | Chakravarthy et al. | 707/736 |
| 7,917,492 B2 * | 3/2011 | Bargeron et al. | 707/708 |
| 7,966,291 B1 * | 6/2011 | Petrovic et al. | 707/641 |
| 8,095,546 B1 * | 1/2012 | Baluja et al. | 707/750 |
| 8,166,029 B2 * | 4/2012 | Park et al. | 707/732 |
| 8,171,052 B2 * | 5/2012 | Takuma et al. | 707/786 |
| 8,200,672 B2 * | 6/2012 | Adachi et al. | 707/739 |
| 2003/0204492 A1 * | 10/2003 | Wolf et al. | 707/3 |
| 2004/0002848 A1 * | 1/2004 | Zhou et al. | 704/2 |
| 2004/0117448 A1 * | 6/2004 | Newman et al. | 709/206 |
| 2005/0080795 A1 * | 4/2005 | Kapur et al. | 707/100 |
| 2005/0149494 A1 * | 7/2005 | Lindh et al. | 707/3 |
| 2005/0171759 A1 | 8/2005 | Uchimoto et al. | |
| 2005/0278325 A1 * | 12/2005 | Mihalcea et al. | 707/6 |
| 2006/0004560 A1 * | 1/2006 | Whitelock | 704/2 |
| 2006/0031219 A1 * | 2/2006 | Chernyak et al. | 707/5 |
| 2006/0041560 A1 * | 2/2006 | Forman et al. | 707/10 |
| 2006/0074900 A1 * | 4/2006 | Nanavati et al. | 707/5 |
| 2006/0136410 A1 * | 6/2006 | Gaussier et al. | 707/5 |
| 2006/0200461 A1 * | 9/2006 | Lucas et al. | 707/5 |
| 2006/0235899 A1 * | 10/2006 | Tucker | 707/200 |
| 2007/0038622 A1 * | 2/2007 | Meyerzon et al. | 707/5 |
| 2007/0067284 A1 * | 3/2007 | Meyerzon et al. | 707/5 |
| 2007/0143278 A1 * | 6/2007 | Srivastava et al. | 707/5 |
| 2007/0186168 A1 | 8/2007 | Waldman et al. | |
| 2007/0192350 A1 * | 8/2007 | Gao et al. | 707/102 |
| 2007/0214137 A1 * | 9/2007 | Gloor | 707/6 |
| 2008/0010281 A1 * | 1/2008 | Berkhin et al. | 707/7 |
| 2008/0022264 A1 | 1/2008 | Macklem et al. | |
| 2008/0059187 A1 * | 3/2008 | Roitblat et al. | 704/257 |
| 2008/0103760 A1 * | 5/2008 | Kirshenbaum | 704/9 |
| 2008/0103762 A1 * | 5/2008 | Kirshenbaum | 704/10 |
| 2008/0103773 A1 * | 5/2008 | Kirshenbaum | 704/252 |
| 2008/0104063 A1 * | 5/2008 | Gallivan et al. | 707/5 |
| 2008/0126303 A1 * | 5/2008 | Park et al. | 707/3 |
| 2008/0133509 A1 * | 6/2008 | Nanavati et al. | 707/5 |
| 2009/0012807 A1 | 1/2009 | Atherton et al. | |
| 2009/0024385 A1 * | 1/2009 | Hirsch | 704/9 |
| 2009/0031224 A1 | 1/2009 | Budreau | |
| 2009/0083257 A1 * | 3/2009 | Bargeron et al. | 707/5 |
| 2009/0144262 A1 * | 6/2009 | White et al. | 707/5 |
| 2009/0171951 A1 * | 7/2009 | Lucas et al. | 707/5 |
| 2009/0222737 A1 * | 9/2009 | Liesche et al. | 715/738 |
| 2009/0234832 A1 * | 9/2009 | Gao et al. | 707/5 |
| 2009/0254799 A1 | 10/2009 | Unger | |
| 2009/0327279 A1 * | 12/2009 | Adachi et al. | 707/5 |
| 2010/0191744 A1 * | 7/2010 | Meyerzon et al. | 707/749 |
| 2010/0211924 A1 * | 8/2010 | Begel et al. | 717/101 |
| 2010/0287148 A1 * | 11/2010 | Resnick et al. | 707/706 |
| 2011/0022355 A1 * | 1/2011 | Cecchi et al. | 702/182 |
| 2011/0106526 A1 * | 5/2011 | Nguyen et al. | 704/9 |
| 2011/0131244 A1 * | 6/2011 | Padovitz et al. | 707/776 |
| 2012/0047149 A1 * | 2/2012 | Zhou et al. | 707/748 |

OTHER PUBLICATIONS

E.L. Hohman, "A Dynamic Graph Model for Representing Streaming Text Documents", Dissertation Abstracts International, vol. 69, No. 4, 2008.

* cited by examiner

GRAPHICAL MODELS FOR REPRESENTING TEXT DOCUMENTS FOR COMPUTER ANALYSIS

BACKGROUND

1. Technical Field

The present invention relates to text document representation and computer analysis.

2. Discussion of the Related Art

In an effort to derive high-quality information from text documents, a variety of text mining and management algorithms exist such as clustering, classification, indexing and similarity search. Most of these applications use the vector-space model for text representation and analysis. The vector-space model is an algebraic model for representing text documents as vectors of identifiers, such as, for example, index terms. While the vector-space model is an effective and efficient representation for mining purposes, it does not preserve information about the ordering of the words in a document.

BRIEF SUMMARY

In accordance with exemplary embodiments of the present invention, there are provided graphical models for representing text documents. The graphical models are built from distance graphs that represent a document in terms of the distances between distinct words. Our distance graph representation retains the positional information of words in a document to provide a rich representation in terms of sentence structure of the underlying data and is effective for mining purposes. This representation is more effective than the vector-space representation, because of its greater power in representing the distances between words.

Exemplary embodiments of the present invention provide a method and computer program product for representing a text document with a graphical model. In the method, a document including a plurality of ordered words may be received and a graph data structure for the document may be created. The graph data structure may include a plurality of nodes and edges, with each node representing a distinct word in the document and each edge identifying a number of times two nodes occur within a predetermined distance from each other. The graph data structure may be stored in an information repository.

DETAILED DESCRIPTION

Figure 1:
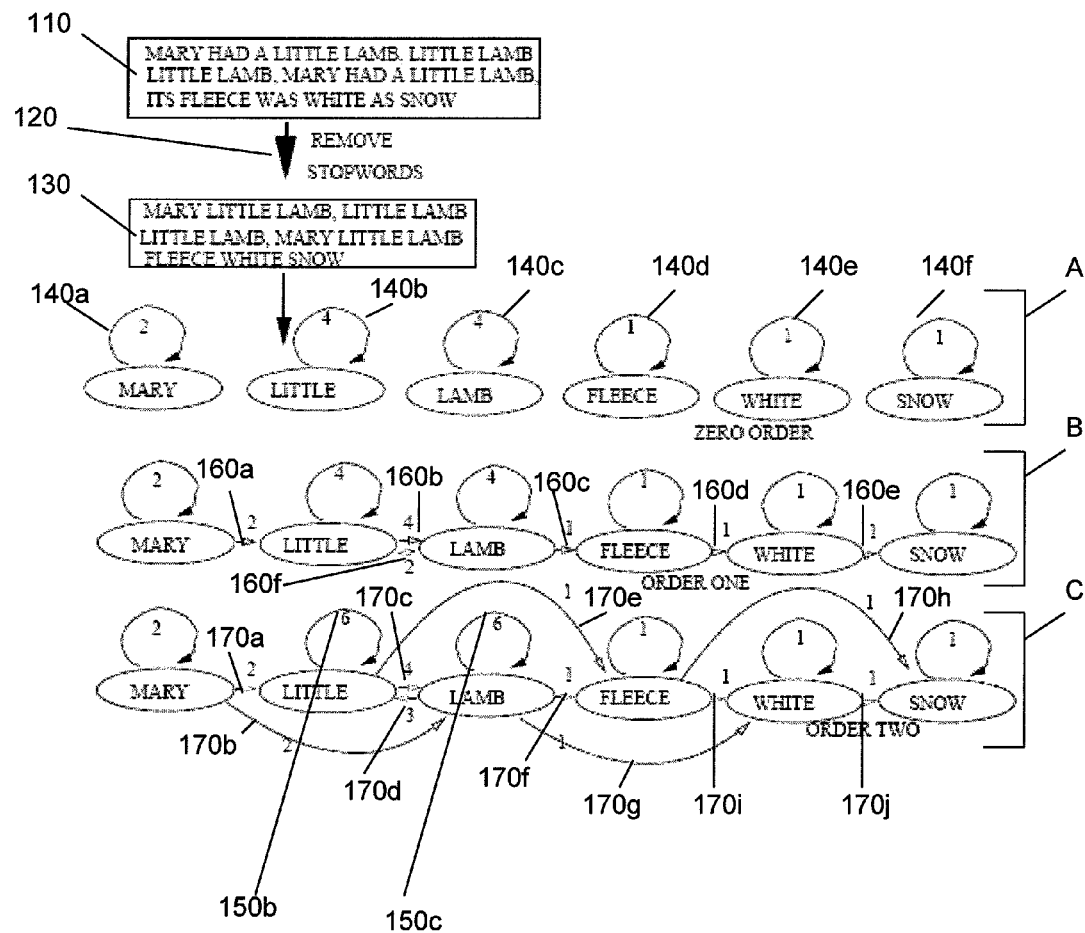
FIG. 1 illustrates distance graph representations of a text fragment according to an exemplary embodiment of the present invention.

In this disclosure, graphical models for representing text documents, according to exemplary embodiments of the present invention, are presented. Hereinafter, we will define distance graphs, which according to exemplary embodiments of the present invention represent a document in terms of the distances between distinct words in the document. Our graphical models are derived by applying a concept from the field of graph theory to the non-analogous field of text document representation. We will also explore a few mining and management applications that use this structural representation.

It will be shown that our distance graph representation allows for effective processing, and results in a high-quality representation of the text in a document. For example, the distance graph representation can retain rich information about the behavior of the underlying data in the document. This rich level of structural information enables applications that are not possible with the lossier vector-space representation, and provides higher quality results with existing applications. It will also be shown that many existing text applications such as clustering can be used directly with a vector-space representation of our structured data only by changing the underlying representation of the text document to the vector-space representation of the edges of our distance graphs.

We will now provide a summary of a distance graph representation according to an exemplary embodiment of the present invention.

A distance graph is a graph formed from a collection of points in the Euclidean plane by connecting two points by an edge whenever the distance between the points is one. The structural representation of distance graphs makes them an effective representation for processing. Distance graphs can be defined to be of a variety of orders depending upon the level of distance information that is retained. Specifically, distance graphs of order k retain information about word pairs that are at a distance of at most k in the underlying document. We define a distance graph as a structure that defines a node for each word in the document corpus, and an edge that exists between a pair of nodes, if the distance between them is less than a certain number.

A distance graph of order k for a document D drawn from a corpus C is defined as a graph $G(C,D,k)=(N(C),A(D,k))$, where $N(C)$ is the set of nodes defined specific to the corpus C, and $A(D,k)$ is the set of edges in the document. The sets and are defined as follows.

The set $N(C)$ contains one node for each distinct word in the entire document corpus C. We will use the term "node i" and "word i" interchangeably to represent the index of the corresponding word in the corpus. Note that the corpus C may contain a large number of documents, and the index of the corresponding word (node) remains unchanged over the representation of the different documents in C. The set of nodes is denoted by $N(C)$, and is a function of the corpus C.

The set $A(D,k)$ contains a directed edge from node i to node j if the word i precedes word j by at most k positions. For example, for successive words, the value of k is 1. The frequency of the edge is the number of times that word i precedes the word j by at most k positions in the document.

Most text collections contain many frequently occurring words such as prepositions, articles and conjunctions. These are known as stop-words. For the distance-graph representation, it is assumed that these words are removed from the text before the distance graph construction. In other words, stop-words are not counted while computing the distances for the graph, and are not included in the node set N(C). This greatly reduces the number of edges in the distance graph representation. This also translates to better efficiency during processing.

In accordance with an exemplary embodiment of the present invention, distance graph representations for a well-known nursery rhyme "Mary had a little lamb" are illustrated in FIG. 1. As shown in FIG. 1, there is provided a text fragment 110. The text fragment 110 is a portion of a text document. The text document may be one of any digital text collection such as news articles, web pages, social network content, blogs, publication documents or any other form of digital text collection. A text document has an inherent word order. In other words, the sentences in the text document contain words in a syntactic arrangement. This arrangement is useful information for mining purposes.

In FIG. 1, stop words are removed 120 and distance graphs are constructed with respect to the remaining words 130. Rows A-C in FIG. 1 represent distance graphs constructed from the pruned text representation 130. Row A shows a zero order directed distance graph, row B shows a first order directed distance graph, and row C shows a second order directed distance graph. A directed distance graph is a graph containing nodes and edges in which there are directions between the edges.

Figure 2:
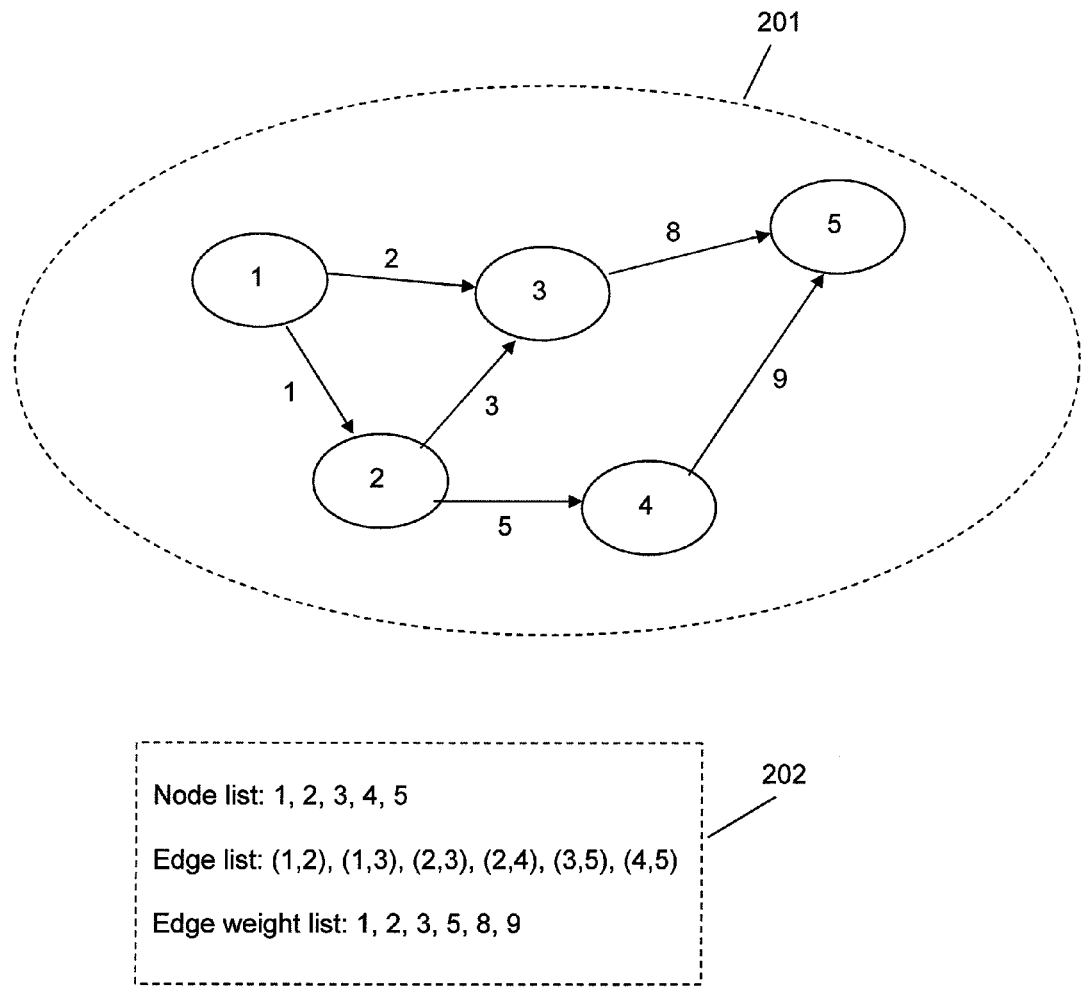
FIG. 2 illustrates a distance graph and a data structure of the distance graph according to an exemplary embodiment of the present invention.

A distance graph 201 and its data structure 202 according to an exemplary embodiment of the present invention are shown in FIG. 2. The data structure 202, which is an internal representation of the distance graph 201 that may be stored in memory, contains a list corresponding to nodes 1, 2, 3, 4, 5 of the distance graph 201 and a list corresponding to the edges (1,2), (1,3), (2,3), (2,4), (3,5), (4,5) of the distance graph 201. The data structure 202 also includes an edge weight list 1, 2, 3, 5, 8, 9 with a one-to-one correspondence with the edge list. The edge weight list contains the frequencies of the edges in the distance graph 201. A frequency of an edge corresponds to how many times the nodes on each side of the edge appear within a predetermined distance of one another. This will become clearer in the further discussion of FIG. 1 below. The data structure 202 is sufficient to perform the processing described in this disclosure.

Referring back to FIG. 1, since the distance graph in row A is a zero order distance graph, it contains only self-loops 140a-140f. A self-loop is the number of times a word occurs within a distance of zero of itself. For example, in self-loop 140a, the number 2 is shown indicating that "MARY" occurs two times within a distance of zero (words) of itself in the pruned representation 130, in self-loop 140b, the number 4 is shown indicating that "LITTLE" occurs four times within a distance of zero (words) of itself in the pruned representation 130, and so forth. The self-loops in row B are the same as those in row A. The self-loops in row C are the same as those shown in rows A and B except for self-loops 150b and 150c. These are noted with the number 6 since the words "LITTLE" and "LAMB" occur six times within a distance of two (words) of themselves.

As shown in FIG. 1, the number of edges increases for distance graphs of successively higher orders. The zero order graph in row A contains no edges. The order one graph in row B contains edges 160a-160f and the order two graph in row C contains edges 170a-170j. The edges 160a-160f in row B represent how many times (e.g., the frequency) a word is found within a distance of one from another word. For example, as shown in row B, the edge between "MARY" and "LITTLE" is denoted by 2 since "MARY" is found twice within a distance of one (word) of the word "LITTLE." In addition, the edge 160f in row B is denoted by 2 since the word "LAMB" is sandwiched between the words "LITTLE" twice.

The edges 170a-170j in row C represent how many times a word is found within a distance of two from another word. For example, "LITTLE" occurs after "LAMB" within a distance of two at most twice. Therefore, the edge 170a is labeled by 2. Similarly, "LAMB" occurs after "MARY" within a distance of two at most twice. Correspondingly, the edge 170b is labeled by 2 as well.

As shown in FIG. 1, the values of the self-loops in the order two distance graph of row C are greater than the order zero and order one distance graphs of rows A and B, respectively. This is because of repetitive words like "LITTLE" and "LAMB" occur within alternate positions of one another. Such repetitions do not change the values of the self-loops of the order zero and order one distance graphs of rows A and B, respectively, but do affect the order two distance graph of row C, hence self-loops 150b and 150c.

Each node in FIG. 1 has a label that corresponds to the actual text word in the original distance graph. These labels may be useful in relating the distance graphs for different documents to one another.

As can be gleaned, the distance graphs of higher orders are richer than distance graphs of lower orders, though this is not necessarily true for orders higher than five or ten. For example, a distance graph with an order greater than the number of distinct words in the document would be a complete clique. Clearly, this does not necessarily encode useful information. On the other hand, distance graphs of order zero do not encode much useful information either. In examining the relative behavior of the distance graphs of different orders, the distance graphs of low orders turn out to be the more effective.

From a database perspective, distance graphs can be represented in XML with attribute labels on the nodes corresponding to word identifiers, and labels on the edges corresponding to the frequencies of the edges. Such a representation is useful in that data management and mining techniques for such semi-structured data already exist. Thus, this representation can be directly used for these applications (e.g., clustering, classification and similarity search). Later, we will describe how some common text applications such as clustering, classification and frequent pattern mining can be used with our distance graph representation.

As mentioned prior, the distance graphs of rows A-C in FIG. 1 are directed graphs, each accounting for the ordering of the words in the graph. In some applications, however, it may be useful to relax the ordering a bit to allow some flexibility in the distance graph representation. To do this, undirected graphs can be used. Undirected graphs allow for a large variation of the number of applications that can be used, since they are simpler to deal with (as compared to directed graphs) for mining applications. The main difference between directed graphs and undirected graphs is that the edges in the undirected graph are undirected.

Figure 3:
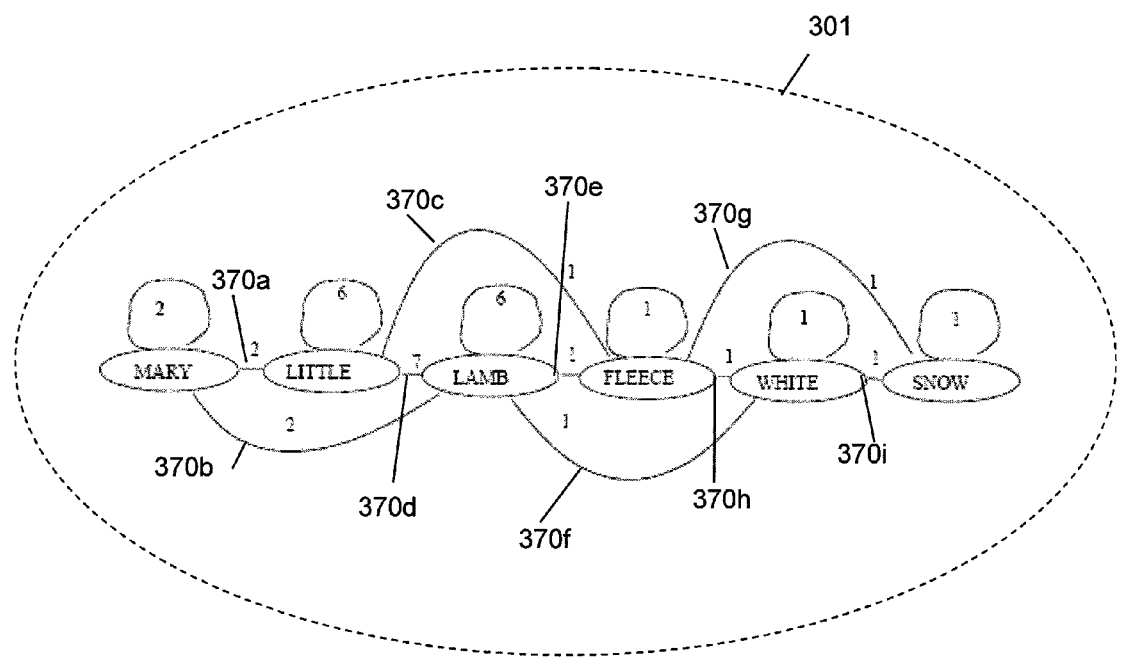
FIG. 3 illustrates an undirected distance graph representation of a text fragment according to an exemplary embodiment of the present invention.

FIG. 3 illustrates an undirected distance graph representation of a text fragment according to an exemplary embodiment of the present invention. More specifically, the undirected distance graph 301 in FIG. 3 corresponds to the order two distance graph in row C of FIG. 1. It is clear that the undirected distance graph 301 can be derived from the order two directed distance graph in row C of FIG. 1 by replacing the directed edges (all of the edges 170a-170j with arrows in FIG. 1) with undirected edges 370a-370i (having no arrows) of the same frequency. In case edges in both directions exist, we can derive the frequencies of the corresponding undirected edge by adding the frequencies of the bi-directional edges. For example, the frequency of the undirected edge 370d in FIG. 3 is the sum of the frequency of the directed edges 170c and 170d in FIG. 1. As can be seen, the undirected representation loses some information about ordering, but retains information on distances. The undirected distance graph representation may be used in the case where different languages express the same word translations for a given text fragment, but the ordering is different.

An exemplary embodiment of the present invention will now be described with reference to apparatus 401 in FIG. 4. The apparatus 401, which may be a computer, includes a memory 402, a disk 403, and a processor such as a central processing unit (CPU) 404.

It is to be understood that the term "processor" as used herein is intended to include any processing device, such as, for example, one that includes a CPU and/or other forms of processing circuitry. Further, the term "processor" may refer to more than one individual processor. The term "memory" is intended include memory associated with a processor or CPU, such as, for example, RAM, ROM, a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer).

Figure 4:
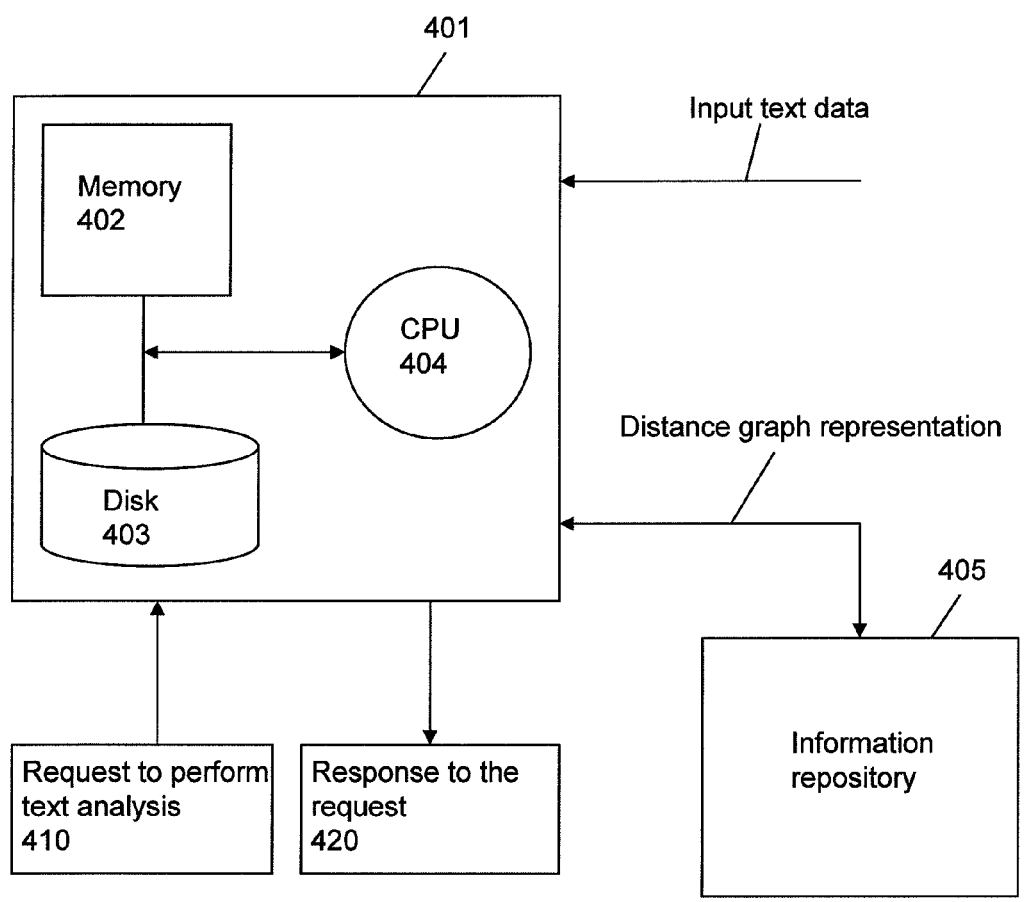
FIG. 4 illustrates an apparatus for implementing exemplary embodiments of the present invention.

As shown in FIG. 4, when the apparatus 401 receives input text data via an input interface, it may be stored on the disk 403. The input text data may come from any document collection that is utilized for the purposes of processing. The input text data is processed in the CPU 404 to create a distance graph representation of the input text data in a manner described above with references to FIGS. 1-3, for example. Intermediate computations during the distance graph creation may be stored in the memory 402. The distance graph representation is output through an output interface of the apparatus 401 to an information repository 405. The information repository 405 may be in the form of a disk storage device on which the different representations of the documents are stored. The distance graph representation can be stored in any kind of database for future processing.

To perform a text analysis of the graph, the distance graph representations may be accessed in the information repository 405 by the apparatus 401 or another computing apparatus. The distance graph representations may then be analyzed to determine an analytical result for a particular application. For example, to determine whether a particular sentence fragment occurs in any document in the information repository 405, first construct a distance graph representation for the query fragment, and then search the information repository 405 to determine if the query graph is present in any of the distance graph representations in the information repository 405. In some embodiments, a request to perform text analysis 410 may be input to apparatus 401, such as a search request that is input from a user. In some embodiments, a response 420 to the request is output from apparatus 401.

Figure 5:
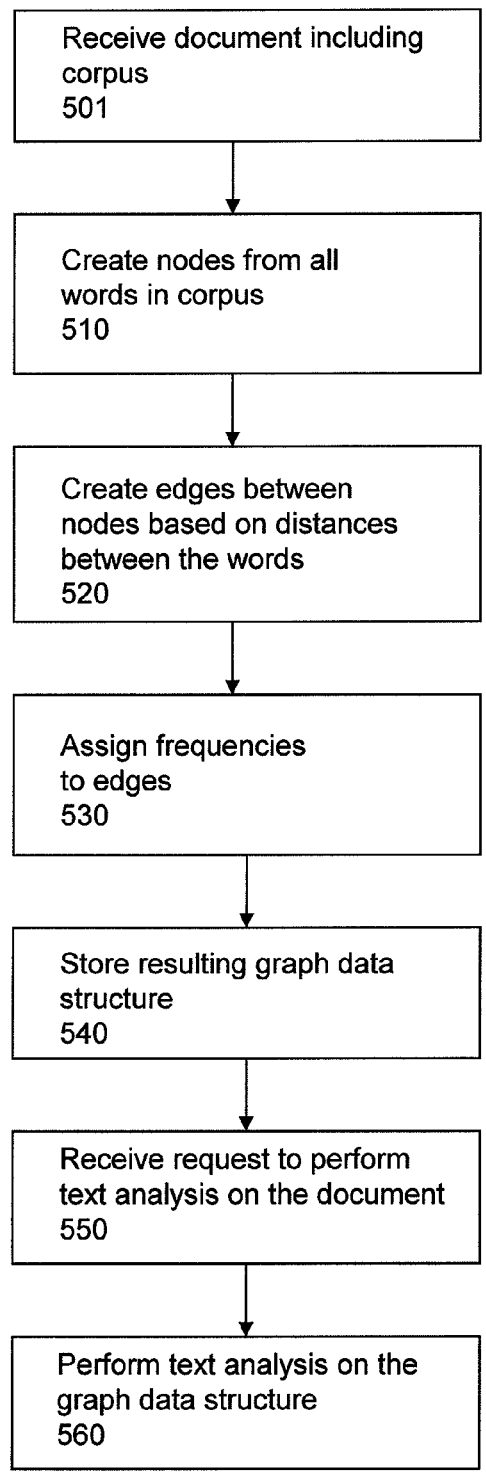
FIG. 5 illustrates a process of constructing a distance graph according to an exemplary embodiment of the present invention.

FIG. 5 illustrates a process of creating a distance graph representation according to an exemplary embodiment of the present invention. The process of distance graph creation involves the determination of three kinds of entities: (i) nodes, (ii) edges and (iii) frequencies between edges. The distance graph contains one node for each distinct word in the vocabulary. At 501, a document including a corpus of ordered words is received, such as the words shown in FIG. 1. Next, a graph data structure is created for the document, the graph data structure including nodes and edges, each node representing a distinct word in the document and each edge identifying a number of times two nodes occur within a predetermined distance from each other. In some embodiments, the predetermined distance is based on an order value of the graph data structure, and in some embodiments an edge is a directed edge or an undirected edge. Therefore, the first step is to determine all the distinct words in the corpus. These distinct words are represented as nodes in step 510. In step 520, we create edges between the nodes based on the distances between the words. For distance graphs of order k, we create edges between all pairs of words, between which the distances are at most k. We note that step 520 may be implemented differently depending upon whether we need a directed or undirected graph. In step 530, we determine the frequencies of these edges. The frequencies of these edges are determined by the number of times the edges may occur at a distance of at most k in the distance graph representation. The result of this process may be one of the distance graphs shown in FIGS. 1 and 3.

Next, at 540, the graph data structure is stored in an information repository, such as 405 in FIG. 4. At 550, there is a request to perform text analysis on the document, such as a search for words within the document (e.g., 410 in FIG. 4). At 560, a text analysis is performed on the graph data structure and a result is provided that is responsive to the request (e.g., 420 in FIG. 4). In some embodiments, after receiving the document and before creating the graph data structure, the method further comprises pruning stop words from the document, wherein the graph data structure is created from the pruned document.

Figure 6:
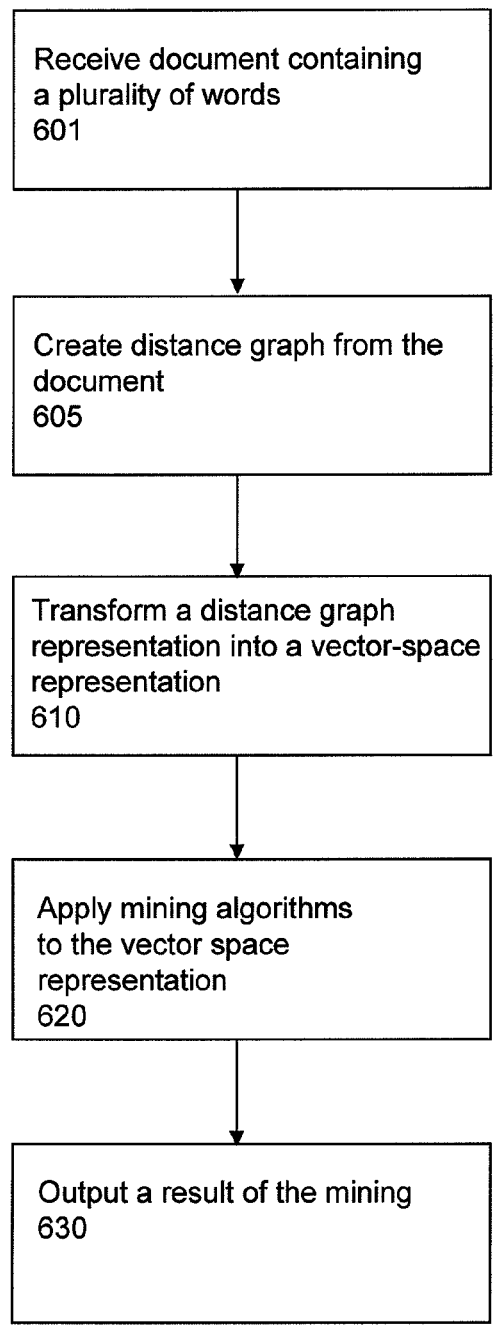
FIG. 6 illustrates a process of transforming a distance graph into a text representation for mining purposes according to an exemplary embodiment of the present invention.

FIG. 6 illustrates a process by which a distance graph representation according to an exemplary embodiment of the present invention is used for mining purposes. First, at 601 a document containing a plurality of words is received, and at 605 a distance graph is created, as discussed above. To use our distance graph representation in conjunction with a mining algorithm, as shown in FIG. 6, we first transform the distance graph into a vector-space representation 610. To visualize this, let us consider the order one distance graph in row B of FIG. 1. In this case, we create a new pseudo-word for each edge and we assign a weight to the edge. The pseudo-word is a concatenation of the words at the beginning and end of the edge and the weight is a frequency of the edge. For example, the edge from "MARY" to "LITTLE" has weight 2, whereas the edge from "LITTLE" to "LAMB" has weight 4. Therefore, we create a new word "MARY-LITTLE" with weight 2, and a new word "LITTLE-LAMB" with weight 4. The resulting vector-space representation is a list of the new words with their corresponding weight frequencies.

In step 620, text management and mining algorithms can be applied directly to the modified vector-space representation. An example of such an application would be a similarity search application. In this application, we can compute the similarity of two documents by examining the number of edges that are common between the two graphs using our modified vector-space representation. Such an approach would yield superior results to the standard similarity search based purely on the standard vector-space representation. At 630, a result of the mining is output, such as in response to a request.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a RAM, a ROM, an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article or manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical functions(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
receiving a document including a plurality of ordered words;
creating a graph data structure for the document, wherein the graph data structure includes a plurality of nodes and edges, each node representing a distinct word in the document and each edge identifying a number of times two nodes occur within at least one word from each other;
storing the graph data structure in an information repository;
receiving a request to perform text analysis on the document; and
performing text analysis on the graph data structure and providing a result that is responsive to the request.

2. The method of claim 1, wherein an edge is a directed edge or an undirected edge.

3. The method of claim 1, wherein after receiving the document and before creating the graph data structure, the method further comprises pruning stop words from the document, wherein the graph data structure is created from the pruned document.

4. The method of claim 1, wherein the text analysis is a text search.

5. The method of claim 1, wherein at least one edge identifies a number of times two nodes occur within two words from each other.

6. A computer program product, comprising:
a computer readable storage medium having computer readable program code embodied therewith, the computer readable program code comprising:
computer readable program code configured to receive a document including a plurality of ordered words; and
computer readable program code configured to create a graph data structure for the document, wherein the graph data structure includes a plurality of nodes and edges, each node representing a distinct word in the document and each edge identifying a number of times two nodes occur within at least one word from each other.

7. The computer program product of claim 6, wherein an edge is a directed edge or an undirected edge.

8. The computer program product of claim 6, wherein after receiving the document and before creating the graph data structure, the computer readable program code of the computer readable storage medium further comprises computer readable program code configured to prune stop words from the document, wherein the graph data structure is created from the pruned document.

9. The computer program product of claim 6, wherein the computer readable program code of the computer readable storage medium further comprises:
computer readable program code configured to receive a request to perform text analysis on the document; and
computer readable program code configured to perform text analysis on the graph data structure to obtain a result that is responsive to the request.

* * * * *